United States Patent [19]

Harrison

[11] 3,777,256

[45] Dec. 4, 1973

[54] DELAY DISTORTION MEASUREMENT SYSTEM

[75] Inventor: John M. Harrison, Gossville, N.H.

[73] Assignee: North Electronics Corporation, Concord, N.H.

[22] Filed: Feb. 14, 1972

[21] Appl. No.: 225,855

[52] U.S. Cl. ........... 324/57 R, 178/69 A, 179/175.3

[51] Int. Cl. ........... G01r 27/00

[58] Field of Search ........... 324/57 DE, 57 R, 324/77 G; 179/175, 175.3; 178/69 A

[56] References Cited

UNITED STATES PATENTS

| | | | |
|---|---|---|---|
| 2,337,541 | 12/1943 | Burgess | 179/175.3 |
| 3,629,696 | 12/1971 | Bartelink | 324/57 R |
| 2,337,540 | 12/1943 | Burgess | 179/175.3 |

*Primary Examiner*—Stanley T. Krawczewicz
*Attorney*—Raymond J. McElhannon

[57] ABSTRACT

A method of measuring frequency delay distortion of a communication channel comprising, generating at a sending end of said channel a plurality of sustained sine wave signals distributed throughout a frequency spectrum of said channel, modulating at a lower frequency each of said sine wave signals in repetitive progression for a preselected period of each, transmitting the modulated signals over said channel to its distant end, and at said distant end, locally generating a signal of frequency substantially that of said modulating frequency, detecting and filtering said modulated incoming signals, and measuring the difference in time between that at which each said detected and filtered signal goes to zero and that at which said locally generated signal goes to zero, for adjacent cycles timewise thereof respectively, the frequency of the locally generated signal being synchronized with the incoming modulating frequency upon receipt of one of said sine wave signals employed as a reference frequency, or alternatively, following receipt of all of said series of sine wave signals and a constant correction applied in accordance with the measured delay of the reference frequency.

7 Claims, 4 Drawing Figures

DELAY DISTORTION MEASUREMENT SYSTEM

This invention pertains to improvements in methods and apparatus for measuring frequency delay distortion in communication channels, such as voice frequency or carrier telephone channels, television channels, data processing channels and the like.

The invention requires only a single channel for measuring delay distortion. It permits delay measurements to be made by a single operator located at one end of the channel. Channel measurements may be made in either direction thereover.

In accordance with the basic principles of the invention, there is provided at the sending end of a channel to be measured for frequency delay distortion, a series of sine wave tone generators of differing frequencies embracing the frequency spectrum of the channel to be measured. The tone generators are connected to successive fixed contacts of a stepping switch, which is periodically actuated —for example at one second intervals, by signals from a standard crystal controlled oscillator, which connects the tone generators in rotative sequence to a modulator, for example an amplitude modulator, for modulating the tone frequencies at approximately fifty percent modulation, by a lower modulating frequency of for example about 20 to 80 hz which is supplied from said standard oscillator. The output from the modulator is passed through an amplifier to the transmitting end of the channel to be measured.

At the receiving end of said channel, the succession of amplitude modulated signals received in sequence from the various tone generators are passed through an amplifier and thence divided into two paths, one of which selectively accepts and detects one of the tone frequencies employed as a reference frequency, while the other path accepts the complete train of modulated tone signals received seriatim from the tone generators, thence rectifies and filters the same into sine wave signals of the periodicity of the modulating frequency, and passes the same through a limiter for converting the same into square wave signals of the modulating frequency. Upon detection of the reference frequency, a crystal controlled oscillator located at the receiving end is, in accordance with one modification of the invention, synchronized with the sending oscillator by adjusting the receiving end oscillator to the incoming modulating frequency. The so adjusted receiving end oscillator transmits to a control logic or comparator circuit a square wave signal of the periodicity of the modulating frequency to which is also concurrently transmitted the sequence of square wave signals from the limiter. The control logic or comparator circuit transmits as an output signal, a square wave signal which measures the difference in time between that at which the signal from the limiter and derived from a selected tone frequency, goes to zero, and that at which the signal from the synchronized receiver oscillator and derived from the reference frequency, goes to zero, on adjacent cycles time wise of each respectively, and thus sequentially measures the time delay of each of the tone signals versus that of the reference tone signal. The switching at the transmitting station from one tone generator to the next is sufficiently slow to permit of making these measurements. These measurements are preferably made by means of high frequency current supplied to the control logic circuit from the receiving end oscillator which divides the aforesaid time delay difference signal in each instance into a series of pulses which are fed to an up/down counter which counts the same and feeds the count to a munerical display unit.

An alternative measuring technique of the invention consists in the following. Instead of synchronizing the receiving end oscillator with the incoming modulating frequency upon detection of the reference frequency as above described, this synchronization of the receiving end oscillator is delayed until receipt of a sequence of the modulated tone frequencies is completed, and then the receiving end oscillator is synchronized with the incoming modulating frequency and the time delay of said frequency adjustment is measured thereby to measure the apparent time delay of the detected reference frequency itself. This measurement also determines the extent of frequency drift of the receiving end oscillator with respect to that of the transmitting end oscillator and can also be used as a constant correction factor as applied to the apparent time delays in receipt of the remaining tone frequencies.

Having described the invention in general terms reference will now be had for a more detailed description to the accompanying drawings wherein.

Figure 1:
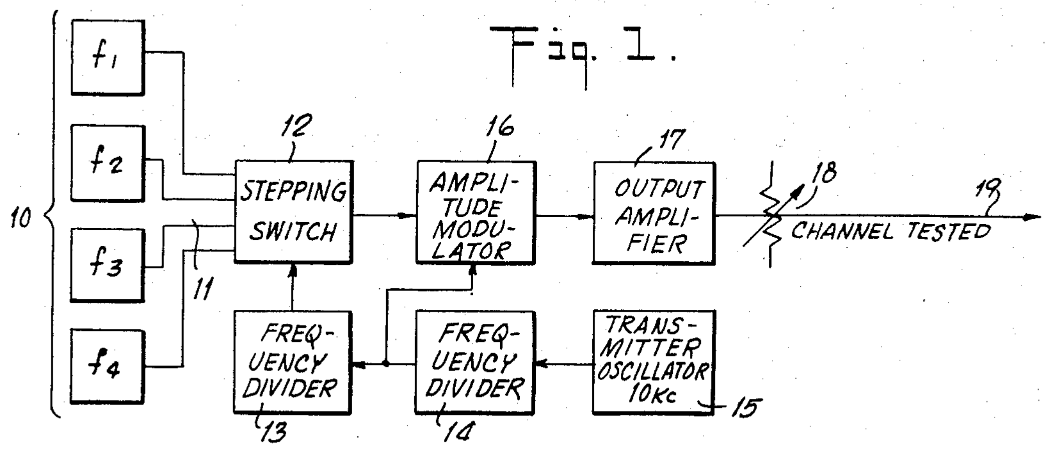
FIG. 1 is a diagrammatic showing of that portion if the delay distortion measuring apparatus of the invention employed at the transmitting end of a communication channel to be measured.

Referring to FIG. 1, the delay transmitter comprises a series of sine wave tone generators 10, four being shown for purposes of illustration only and of frequencies $f_1$ to $f_4$, respectively, representative for example of frequencies 1,000, 1,500, 2,000, and 2,500 hertz (hz) at which the relative delay distortion is to be measured in a voice frequency telephone channel. Additional tone generators may of course be provided spanning a wider frequency range of delay distortion to be measured. Also the generators may generate a range of high frequencies for measuring delay distortion in a carrier frequency, television or data processing channel.

The tone generators are respectively connected as at 11, to fixed contacts of a stepping switch 12, which is periodically actuated at one second intervals by actuating pulses applied thereto through flip-flop frequency dividers 13 and 14, from a crystal controlled standard oscillator 15, operating at for example 10 Kc, for successively and periodically connecting the tone generators to the input of a modulator 16, for example an amplitude modulator, which receives a modulating frequency of for example 20 hz, from the standard oscillator 15, via frequency divider 14. The output from the modulator is transmitted through an output amplifier 17 and an attenuator 18, to the outgoing end of a communication channel 19 to be measured.

Figure 2:
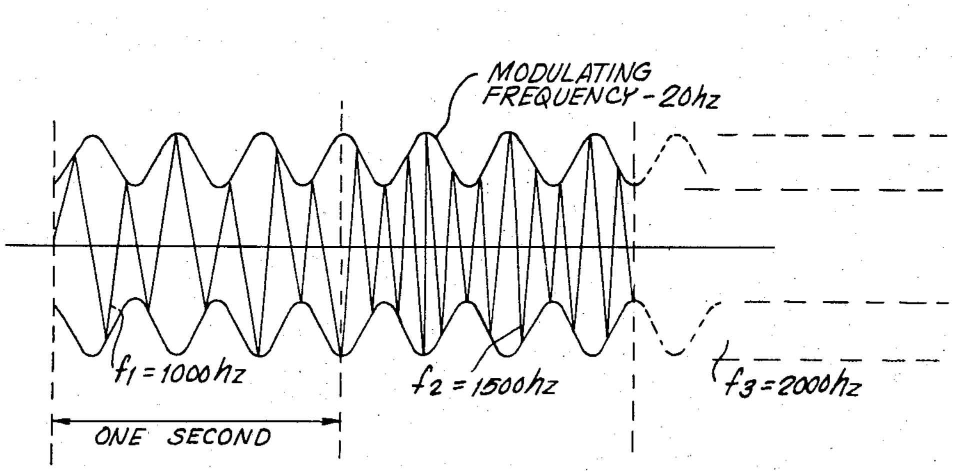
FIG. 2 is a graphical plot in terms of volts as ordinates against time as abscissae, of the modulated tone signals produced by the delay transmitter and transmitted over the communication channel to the receiving end thereof.

The modulated tone signals applied to the channel are plotted graphically in FIG. 2 wherein it is seen that for successive one second intervals, the 20 hz modulated tone frequencies $f_1$–$f_4$ inc. are successively and repetitively transmitted.

Figure 3:
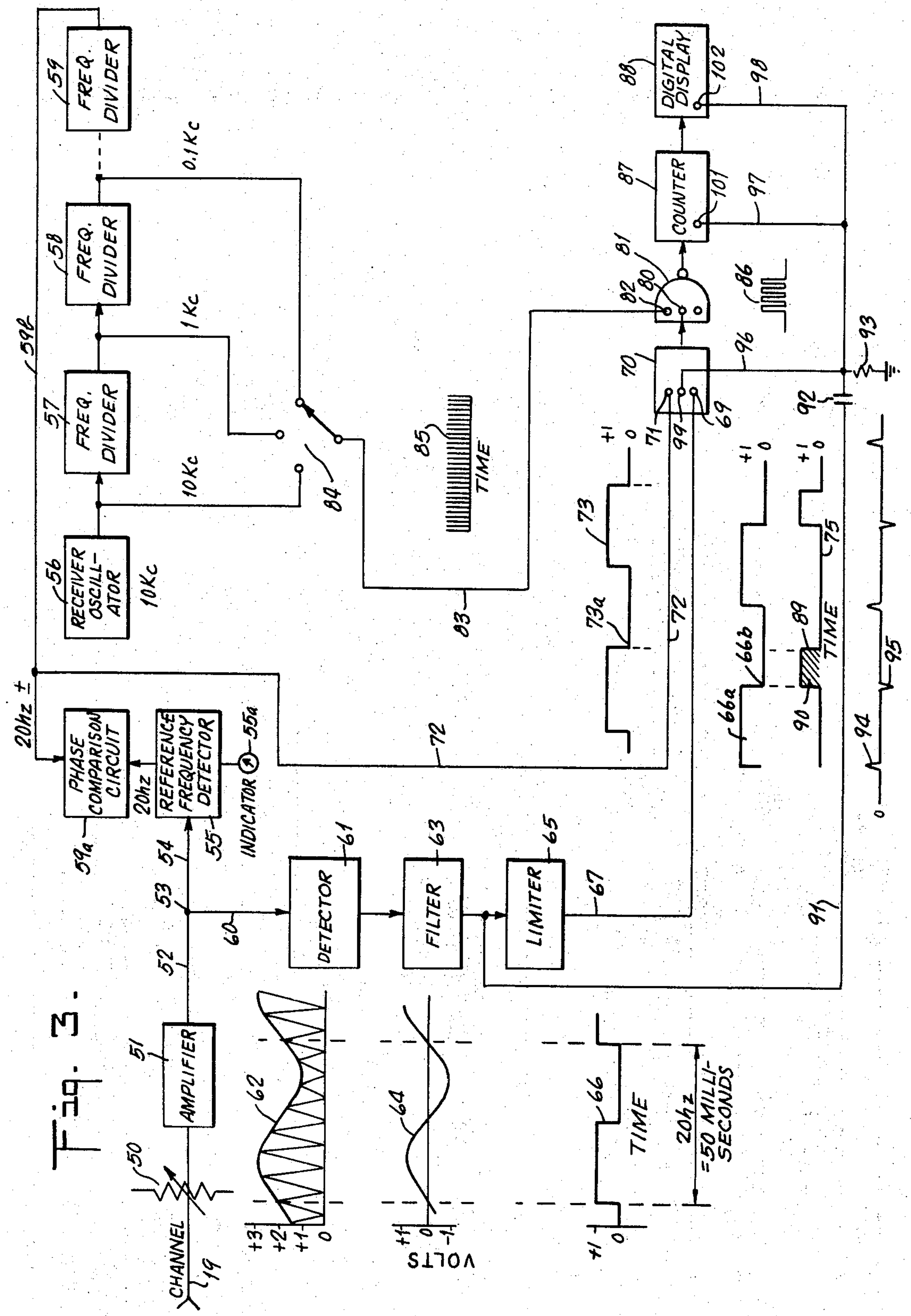
FIG. 3 is a diagrammatic showing of the delay distortion measuring apparatus employed at the receiving end of the channel, together with associated graphical plots of volts against time illustrating the operation of various components of the FIG. 3 circuit.

Referring now to FIG. 3, the modulated wave train incoming over channel 19, is fed thru an attenuator 50, thence thru an amplifier 51, the output of which is connected over a line 52 to a branch point 53, whence a portion of the signal wave train is fed over a line 54 to a reference frequency detector 55, which detects only the reference frequence for example 1,000 c.p.s., reception of which is indicated on meter 55*a*. The modulating frequency of 20 hz resulting from the detection is fed to a phase comparison circuit 59*a* to which a receiver oscillator 56 is connected via a series of flip-flop frequency dividers 57, 58, 59 and over a line 59*b*. The receiver oscillator is crystal controlled to generate a frequency 10 Kc which is stepped down to 20 hz plus or minus, by the frequency dividers. When the reference frequency of 1,000 hz is detected by detector 55, as indicated on meter 55*a*, the frequency of the receiver oscillator is adjusted until the phase comparison circuit shows exact synchronism between the frequency fed thereto from the receiver oscillator and the modulating frequency of the wave train incoming from the transmitting station at that time.

Meantime from the branch point 53, the entire incoming wave train from the transmitting station is fed over a connecting line 60, to a detector 61, which demodulates the modulated wave train, as at 62. The detector output is fed to a filter 63, which eliminates any direct current component to produce a sine wave signal as at 64, of the modulating frequency. The output of the filter is fed to a limiter 65, which is essentially an overloaded amplifier and which produces a square wave output signal as at 66, also of the periodicity of the modulating frequency. The output from the limiter is fed over a line 67, and as at 66a, to a triggering terminal 69 of a flip-flop circuit 70, which may be of the type shown in FIG. 12, page 17–13 of ITT text "Reference Data For Radio Engineers, Fifth Ed."

Concurrently with the feeding of signal 66 as at 66a from the limiter 65 to the triggering terminal 69 of the flip-flop 70, a second square wave signal derived from the synchronized receiver oscillator via the frequency dividers 57–59 inc., is fed to a second triggering terminal 71 of the flip-flop over a line 72, and as at 73.

With the signals 66a and 73 thus impressed on the triggering input terminals of the flip-flop 70, the output signal therefrom is graphically as shown at 75, and measures the delay distortion of any particular tone frequency signal 66 being received at any particular instant as compared to the reference frequency signal 73. Thus if any particular instant of observation, the output from the limiter 65 is derived from the reference frequency signal of 1,000 hz, the signal 66*a* will be so positioned in time as to completely nullify the signal 73, at the output from the flip-flop 70. If on the other hand at the moment of observation, the output from the flip-flop shows a difference signal as at 89, it represents the time delay as between the signal 73 derived from the reference tone signal and that derived from one of the other tone frequency signals. Hence as the incoming wave train impressed on the demodulator 61 progresses at one second intervals thru the sequence of modulated tone frequencies, the delay distortion as shown at the output from the gate 70, will vary periodically from zero at the reference frequency to the delay relative thereto of each the remaining tone frequencies in succession.

For measuring this time delay, the output from the flip-flop 70 is fed to an input terminal 80 of an "and" gate 81, along with a high frequency current fed to a second input terminal 82 thereof, over a line 83, extending to the rotary arm of a switch 84, having fixed contacts respectively connected to the outputs of the receiver oscillator 56 and of the frequency dividers 57 and 58, for optionally supplying to the gate 81, as at 85, any of the high frequencies 10 Kc, 1 Kc, or 0.1 Kc, selected in accordance with the extent of the time delay being measured. The output from gate 81, comprising high frequency pulses, as at 86, is fed to a decimal counter 87 and thence to a digital display unit 88. The gate 81 may be of the type illustrated in FIG. 6, page 32–16 of the aforesaid ITT text.

As shown by comparison of signals 73 and 66*a*, for measuring and dsplaying the delay, the delay distortion for the signal derived from any tone frequency is the difference in time between the time that the output signal 66*a* from the limiter 65 goes to zero and the time when the signal 73, derived from the receiver oscillator 56 goes to zero, on adjacent cycles timewise of each respectively, as at 66b and 73*a*. This difference is shown at 89. The shaded area 90 for the difference signal 89 is proportional to the phase shift. The polarity of the shaded area 90, i.e. whether positive or negative with reference to the zero axis, indicates the polarity of the delay i.e. whether the reference tone signal under measurement is delayed with respect to the reference signal or vice versa.

The flip-flop 70, counter 87 and digital display 88, are reset to zero after each delay measurement is made by means of the circuit 91 extending from the output of filter 63, thru condenser 92 and resistance 93 to ground. Each time the sine wave signal 64 from the filter output goes from positive or negative to zero, a pulse discharge thru the condenser-resistance circuit occurs, as at 94, 95, which pulse resets the aforesaid units via connections 96, 97 and 98 extending to reset terminals 99, 101 and 102 thereof respectively.

Alternatively the output from the gate 81 may be repetitively played up on the screen of an oscilloscope having a measuring indicia thereon, in which case no resetting of any equipment is required. Also the delay distortion thus displayed for the succession of tone frequencies, will be repetitively displayed in rapid progression on the screen for rapid checking of delay measurements.

Instead of measuring the delay distortion of the various tone frequencies vis a vis the reference frequency in the manner above described, the alternative procedure above discussed may be employed. That is to say referring to FIG. 3, the receiver oscillator 56 is not synchronized with the transmitter oscillator until after a complete sequence of all of the tone frequencies have been received. The amount of frequency drift of the receiver oscillator with respect to the transmitter oscillator is then determined by adjusting the receiver oscillator into synchronism with the received modulating frequency and measuring the time delay of such frequency adjustment. This measures the amount of frequency drift of the receiver oscillator with respect to the transmitter oscillator and also measures the apparent delay of the reference frequency itself, which is applied as a constant correction factor to the apparent delays of all of the other time frequencies. With this method of measurement the signals 66*a* of FIG. 3 would appear shifted to the left or right in the drawing with reference to signals 73 by the amount of this constant correction factor and as determined by the direction of such frequency adjustment.

Figure 4:
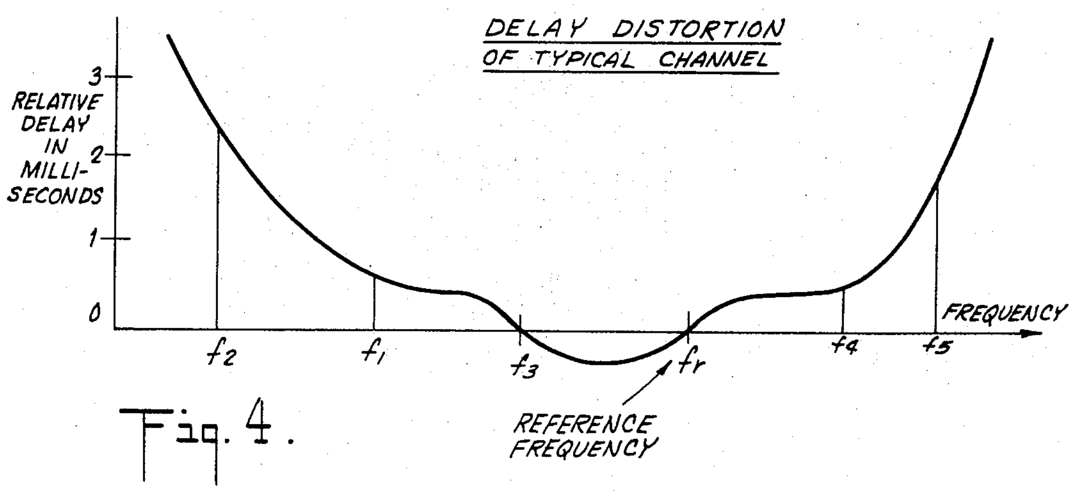
FIG. 4 is a graphical plot of the delay distortion of a typical communication channel as measured by the apparatus of FIGS. 1 and 3, the delay distortion being plotted in terms of relative delay in milli-seconds as ordinates versus frequency as abscissae.

FIG. 4 is a graphical plot of delay distortion of a commercial communication channel as measured in accordance with the invention with respect to which the frequency fr was employed as the reference frequency.

What is claimed is:

1. The method of measuring frequency delay distortion of a communication channel which comprises: generating at a sending end of said channel a plurality of sustained sine wave signals distributed throughout a frequency spectrum of said channel, modulating at a lower frequency each of said sine wave signals in repetitive progression for a preselected period of each, transmitting said modulated signals over said channel to its distant end, and at said distant end, locally generating a signal of frequency substantially that of said modulating frequency, selectively detecting one of said plurality of sine wave signals, and upon said detection synchronizing the frequency of said locally generated signal with the modulating frequency of the received signals, and concurrently therewith, detecting and filtering all of said modulating incoming signals into signals of said modulating frequency, and measuring the difference in time between that at which any said detected and filtered signal goes to zero and that at which said locally generated, synchronized signal goes to zero for adjacent cycles timewise thereof respectively.

2. The method according to claim 1 wherein said sine wave signals are amplitude modulated at the sending end of said channel.

3. The method of measuring frequency delay distortion of a communication channel which comprises: generating at a sending end of said channel a plurality of sustained sine wave signals distributed throughout a frequency spectrum of said channel, modulating at a lower frequency each of said sine wave signals in repetitive progression for a preselected period of each, transmitting said modulated signals over said channel to its distant end, and at said distant end, locally generating a substantially square wave signal of frequency substantially that of said modulating frequency, selectively detecting one of said plurality of sine wave signals, and upon said detection synchronizing the frequency said locally generated signal with the modulating frequency of the received signals, and concurrently therewith, detecting and filtering all of said modulated received signals and converting to substantially square wave signals of the periodicity of said modulating frequency, and measuring the difference in time between that at which any said detected and filtered square wave signal goes to zero and that of which said locally generated, synchronized, square wave signal goes to zero for adjacent cycles timewise thereof respectively.

4. The method according to claim 3 wherein for measuring said difference said square signals are differentially gated and the widths of the pulses of the resultant square signals measured.

5. The method according to claim 4 wherein the pulse width of each of said resultant square wave signals is measured by gating said resultant square wave signals with a high frequency signal and automatically counting the pulses of the signal resulting from said gating.

6. The method of measuring frequency delay distortion of a communication channel which comprises: concurrently generating at a sending end of said channel a plurality of sustained sine wave signals distributed throughout a frequency spectrum of said channel, modulating at a lower frequency each of said sine wave signals in repetitive progression thereof and for a preselected period of each, transmitting said modulated signals over said channel to its distant end, and at said distant end, locally generating a signal of frequency substantially that of said modulating frequency, selectively detecting one of said plurality of sine wave signals by demodulation of the incoming carrier wave signals, thereupon adjusting the frequency and phase of said locally generated signal to exact synchronism with the modulating frequency of the received modulated signals, meantime detecting and filtering all of said modulated received signals and converting to substantially square wave signals each of zero average amplitude and of the periodicity of said modulating frequency, converting said locally generated synchronized signal to a substantially square wave signal of zero average amplitude and measuring the difference in time between that at which any said detected and filtered signal goes to zero and that at which said locally generated signal goes to zero for adjacent cycles timewise thereof respectively.

7. The method of measuring frequency delay distortion of a communication channel which comprises: generating at a sending end of said channel a plurality of sustained sine wave signals distributed throughout a frequency spectrum of said channel, modulating at a lower frequency each of said sine wave signals in repetitive progression for a preselected period of each, transmitting said modulated signals over said channel to its distant end, and at said distant end, locally generating a signal of frequency substantially that of said modulating frequency, detecting and filtering all of said modulated incoming signals into signals of the periodicity of said modulating frequency, measuring the difference in time between that at which each of said detected and filtered signals goes to zero and that at which said locally generated signal, goes to zero for adjacent cycles timewise thereof respectively, thereupon synchronizing said locally generated signal frequency with the incoming modulating frequency, and applying the time delay of any such frequency adjustment required as a constant correction factor to said difference in time measurements.

* * * * *

UNITED STATES PATENT OFFICE
CERTIFICATE OF CORRECTION

Patent No. 3,777,256 Dated December 4, 1973

Inventor(s) JOHN M. HARRISON

It is certified that error appears in the above-identified patent and that said Letters Patent are hereby corrected as shown below:

In the Introduction the Assignee should correctly read --NORTHEAST ELECTRONICS CORPORATION--.

Signed and sealed this 14th day of May 1974.

(SEAL)
Attest:

EDWARD M.FLETCHER,JR.
Attesting Officer

C. MARSHALL DANN
Commissioner of Patents

ORM PO-1050 (10-69)

USCOMM-DC 60376-P69
★ U.S. GOVERNMENT PRINTING OFFICE : 1969 O—366-334